US007621806B2

(12) United States Patent
Bottemiller et al.

(10) Patent No.: US 7,621,806 B2
(45) Date of Patent: Nov. 24, 2009

(54) DETERMINING THE POSITION AND ANGULAR ORIENTATION OF FOOD PRODUCTS

(75) Inventors: Robert Bottemiller, Bellevue, WA (US); George Blaine, Lake Stevens, WA (US); Craig E. Pfarr, Issaquah, WA (US)

(73) Assignee: John Bean Technologies Corporation, Chicago, IL (US)

( * ) Notice: Subject to any disclaimer, the term of this patent is extended or adjusted under 35 U.S.C. 154(b) by 0 days.

(21) Appl. No.: 12/273,491

(22) Filed: Nov. 18, 2008

(65) Prior Publication Data

US 2009/0137195 A1    May 28, 2009

Related U.S. Application Data

(63) Continuation-in-part of application No. 11/323,340, filed on Dec. 30, 2005, now Pat. No. 7,452,266.

(60) Provisional application No. 60/640,282, filed on Dec. 30, 2004.

(51) Int. Cl.
*A22C 21/00* (2006.01)
*G06F 19/00* (2006.01)
*B26D 1/00* (2006.01)
(52) U.S. Cl. .......................... 452/150; 83/367; 700/29; 700/173
(58) Field of Classification Search ................ 452/150, 452/156, 158; 83/13, 363, 365, 368, 371, 83/177; 700/28–30, 97, 173
See application file for complete search history.

(56) References Cited

U.S. PATENT DOCUMENTS

| 4,875,254 A | * | 10/1989 | Rudy et al. | ................ | 452/157 |
| RE33,904 E | * | 4/1992 | Rudy et al. | ................ | 452/150 |
| 5,324,228 A | * | 6/1994 | Vogeley, Jr. | ................ | 452/158 |
| 6,563,904 B2 | * | 5/2003 | Wijts et al. | ................ | 378/58 |
| 6,604,991 B1 | | 8/2003 | Jurs | | |
| 7,251,537 B1 | * | 7/2007 | Blaine et al. | ................ | 700/29 |

FOREIGN PATENT DOCUMENTS

| GB | 1491156 | 11/1977 |
| GB | 2171894 A | 9/1986 |

* cited by examiner

*Primary Examiner*—Thomas Price
(74) *Attorney, Agent, or Firm*—Christensen O'Connor Johnson Kindness PLLC (57) ABSTRACT

A portioning system (10) includes a scanner (16) for scanning a passing poultry breast (14). A cutting device (18), a slicing device (20) and/or other equipment may be used to portion, trim, or otherwise process the poultry breast under the control of a computer (22). The computer also utilizes the information from the scanner to determine position and the angular orientation of the poultry breast relative to a reference line by determining directional lines corresponding to physical attributes of the poultry breast. One directional line is related to the principal axis of the poultry breast, determined from the axis of least inertia of the poultry breast when analyzing the regions of the poultry breast above a selected elevation of the poultry breast.

21 Claims, 8 Drawing Sheets

DETERMINING THE POSITION AND ANGULAR ORIENTATION OF FOOD PRODUCTS

CROSS-REFERENCES TO RELATED APPLICATIONS

This application is a continuation-in-part of U.S. patent application Ser. No. 11/323,340, filed Dec. 30, 2005, which claims the benefit of U.S. Provisional Application No. 60/640,282, filed Dec. 30, 2004, the disclosures of which are expressly incorporated herein by reference in their entirety.

TECHNICAL FIELD

The present invention relates generally to equipment and techniques for processing work pieces, such as food products, and more particularly to determining the angular orientation of a food product relative to a reference direction to facilitate processing of the food product.

BACKGROUND

Food products are cut or otherwise divided into smaller portions by processors in accordance with customer needs. Also, excess fat, bone or other foreign or undesirable materials are routinely trimmed from the food products. Much of the portioning/trimming of the food products, is now carried out with the use of high-speed portioning machines. These machines use various scanning techniques to ascertain the size and shape of the food product as it is being advanced on a moving conveyor. This information is analyzed with the aid of a computer to determine how to most efficiently portion the food product into the desired sizes, weights, or other criteria being used. For example, if the food product portions of a specific weight are desired, the information from the scanner may be employed to control the operation of a cross-cutting device to cut the food product into desired sizes. If the food product changes in width or thickness along its length, the location of a cross-cut made in the food product to achieve a desired end portion weight may be controlled.

The scanning of food products and the use of the scanning data to analyze the food products and determine how to cut, slice, or otherwise process the food products is facilitated if the food products are all aligned in the same direction. The reason for this is that portioning of a food product, such as fish, poultry or meat, is carried out in relationship to the shape of the food product. For example, fish strips are cut perpendicular to the long axis of the fish fillet. Beef tip-steaks are cut from two dimensions at approximately right angles determined by the edges of the roughly triangular input product. Further, chicken sandwich portions and nuggets are cut from whole chicken breasts with regard to the left-right symmetry relative to the keel of the breast. If the food products are carefully placed on the infeed belt with all of the food products having the same orientation, then the software used to determine how to portion the food product only needs to establish food product location in one direction, i.e., transverse to the length of the conveyor belt. For food products, achieving such alignment is difficult. It requires close attention by loading personnel, which is not always feasible or realistic.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A system for trimming and/or portioning food products includes a scanner for scanning the passing food product and a data processor for processing the data from the scanner to establish the location and thickness profile of the food product. To facilitate determining how to trim/portion the food product, the data processor is programmed to determine the location and angular orientation of the food product relative to a reference line by making one or more determinations from the scanning data. In this regard, the orientation of the principal axis of the food product may be determined by establishing the line of least inertia from the second moment of the volume or area distribution of the food product. Rather than using the entire volume or area distribution of the food product, the food product can be analyzed at or above a specific elevation above the bottom surface of a food product. This may eliminate irrelevant physical features of the food product due to deformities, tears, or other undesirable features of the food product. Also, directional lines can be determined from notches, and/or projections, and/or other physical features located on the food product corresponding to physical characteristics of the food product. A directional line in addition can be determined from the scanning data corresponding to a linear depression extending along the food product wherein the direction of the depression is geometrically related to the food product.

The principal axis of a food product, or a directional line of a food product, can be determined from looking at regions of the food product at a specific elevation or elevations of the food product. For specific types of food products, for instance poultry breasts, this technique produces two spaced apart regions of the food product located above the analysis elevation. A central feature of the two spaced-apart elevated regions is located, and a first line segment drawn between the two located central features. Thereafter, a second line bisects the first line and extends perpendicularly thereto, with such second line corresponding to the principal axis or a desired directional line of the food product.

As an alternative, one of the elevated regions of the food product can be selected, and a mirror image of that region generated and then placed as close as possible to the selected region, so that the resulting line of symmetry between the selected region and the mirror image region corresponds to the principal axis or the desired directional line. The computer may be programmed to combine two or more of these determinations to arrive at the angular orientation of the food product.

Also the computer may be programmed to assign relative values to the determinations of the axis/directional lines, which valuations are taken into consideration to arrive at a "best determination" of the position and angular orientation of the food product. The valuations of the axis/directional lines can be based on experience as to which of the axis/directional lines historically has provided the most accurate indication of the actual angular orientation of the food product.

The system can be used to trim, portion, or otherwise process various food products, for example, poultry breasts. In this regard, the poultry breasts are scanned, and the scanning data is used by a computer to generate the area distribution and/or volume distribution of the poultry breasts, as well as the location of the poultry breast on a moving conveyor. The scanning data is also used to determine the direction of one or more directional lines related to the axis of symmetry (direction of the keel valley) of the poultry breasts. These directional lines may be determined from, for example, the line of least inertia of the poultry breasts calculated from the second moment of the entire area or volume distribution of the poultry breasts, or from regions of the poultry breasts above a selected elevation of the poultry breasts. A directional line can also be established from a line extending between the neck notch and the tail projection of the poultry breasts. In addition, a directional line can be determined by locating a linear depression formed in the poultry breast corresponding to the location of the keel cartilage of the poultry breast.

Alternatively, the poultry breast could be analyzed at a particular elevation, wherein a region is defined on each side of the poultry breast, a central feature of each region can be defined, and a line segment drawn between the two defined central features, and then a second line, bisecting the first line, is drawn perpendicularly to the second line, with the second line being a directional line corresponding to the location of the keel cartilage.

Further, one of the elevated regions of the poultry breast can be selected, and a mirror image of such region generated and placed adjacent the selected region. The resulting line of symmetry between the selected and mirror image regions corresponds to the location of the keel cartilage or keel valley. These various directional axis lines can be combined by mathematical techniques, which techniques may include assigning relative values to the directional axis lines based on the expected or perceived accuracy of the directional lines.

Once the location and angular orientation of the poultry breast is determined, the poultry breast can be processed. In this regard, cutting devices can be used to remove the keel cartilage from the poultry breast. In addition, fat and other waste can be trimmed from the poultry breast. These process operations can be accurately carried out without the poultry breast having to be precisely positioned on the conveyor, either transversely to the width of the conveyor or angularly relative to the length of the conveyor. Further, with the location and angular orientation of the poultry breast known, the computer can be used to determine how to divide the poultry breast into portions of desired sizes. In addition or in the alternative, cutting and slicing and other devices can be used to portion the poultry breast to end portions of desired sizes.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
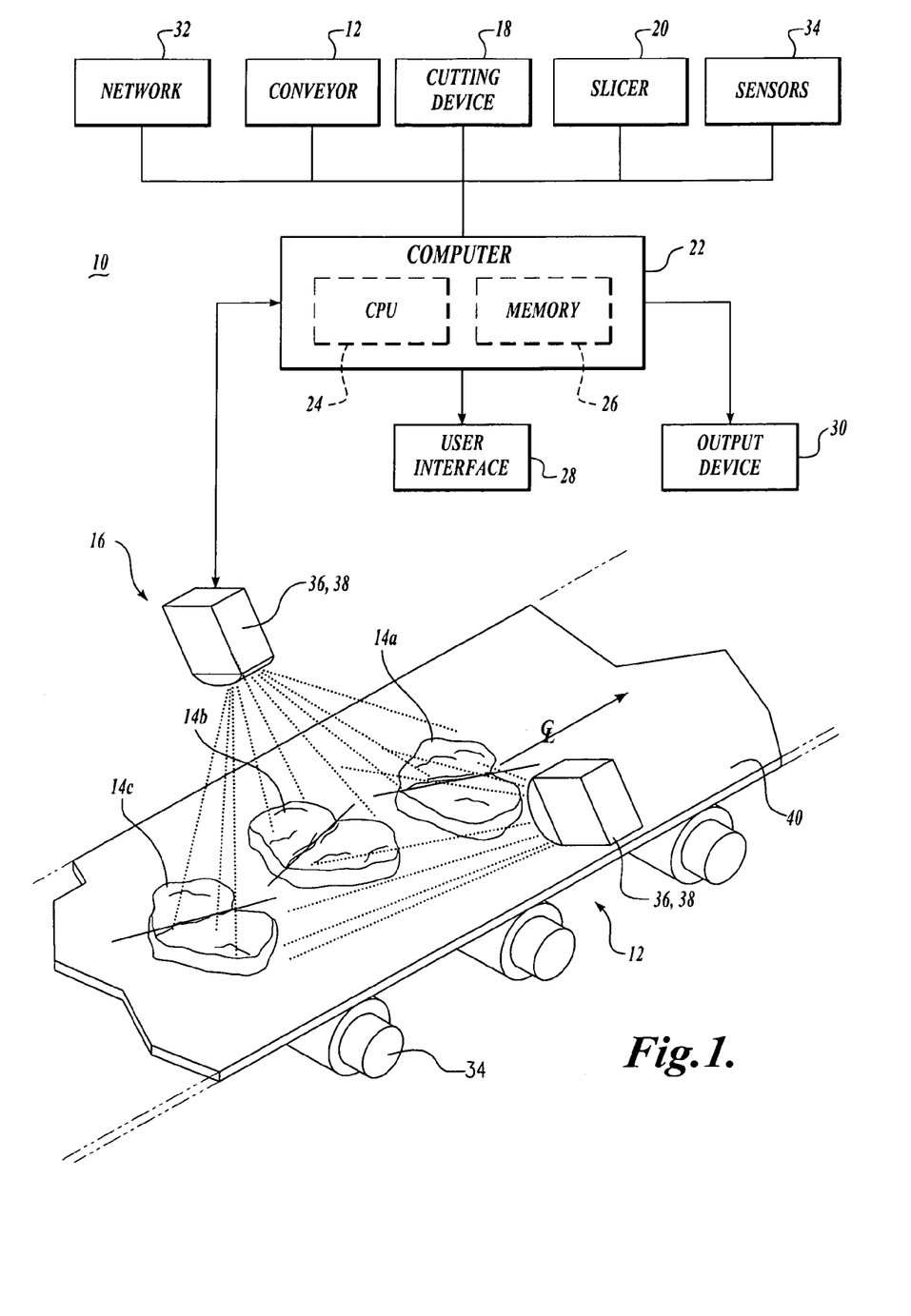
FIG. 1 is a schematic view of a disclosed embodiment.

FIG. 1 schematically illustrates an embodiment of the present invention, designated as system 10. System 10 includes a conveyor 12 for carrying food products (poultry breasts) 14*a*, 14*b*, 14*c* (collectively referred to as food product 14). The system 10 also includes a scanning system 16 for scanning the food product 14 as the food product passes by on the conveyor. Although only one conveyor 12 is illustrated, system 10 may utilize more than one conveyor, for example a loading conveyor, a processing conveyor, and an unloading conveyor. The system may also include a cutting device 18 located downstream from the scanning system 16 for trimming the food product and/or cutting the food product into one or more end pieces of desired sizes or other physical parameters. The cutting device may also be used to remove cartilage or bones from the food product, for example, the keel cartilage 19 from a poultry breast 14, shown in FIG. 3. The system 10 may further include a slicing device 20 located as illustrated downstream from the cutter. The slicer instead may be located upstream from the cutting device. In addition, other processing equipment may be utilized in addition to or in lieu of cutting device 18 and/or slicing device 20. Such equipment may be used for a wide range of processes, including for example, cooking, steaming, frying, baking, roasting, grilling, boiling, battering, freezing, marinating, rolling, flattening, drying, dehydrating, tenderizing, cutting, portioning, trimming, slicing, deboning, diverting, or off-loading the food product. The conveyor 12, the scanning system 16, the cutter 18, the slicer 20, as well as other processing equipment are coupled to, and controlled by, a computer or data processor 22.

Figure 2:
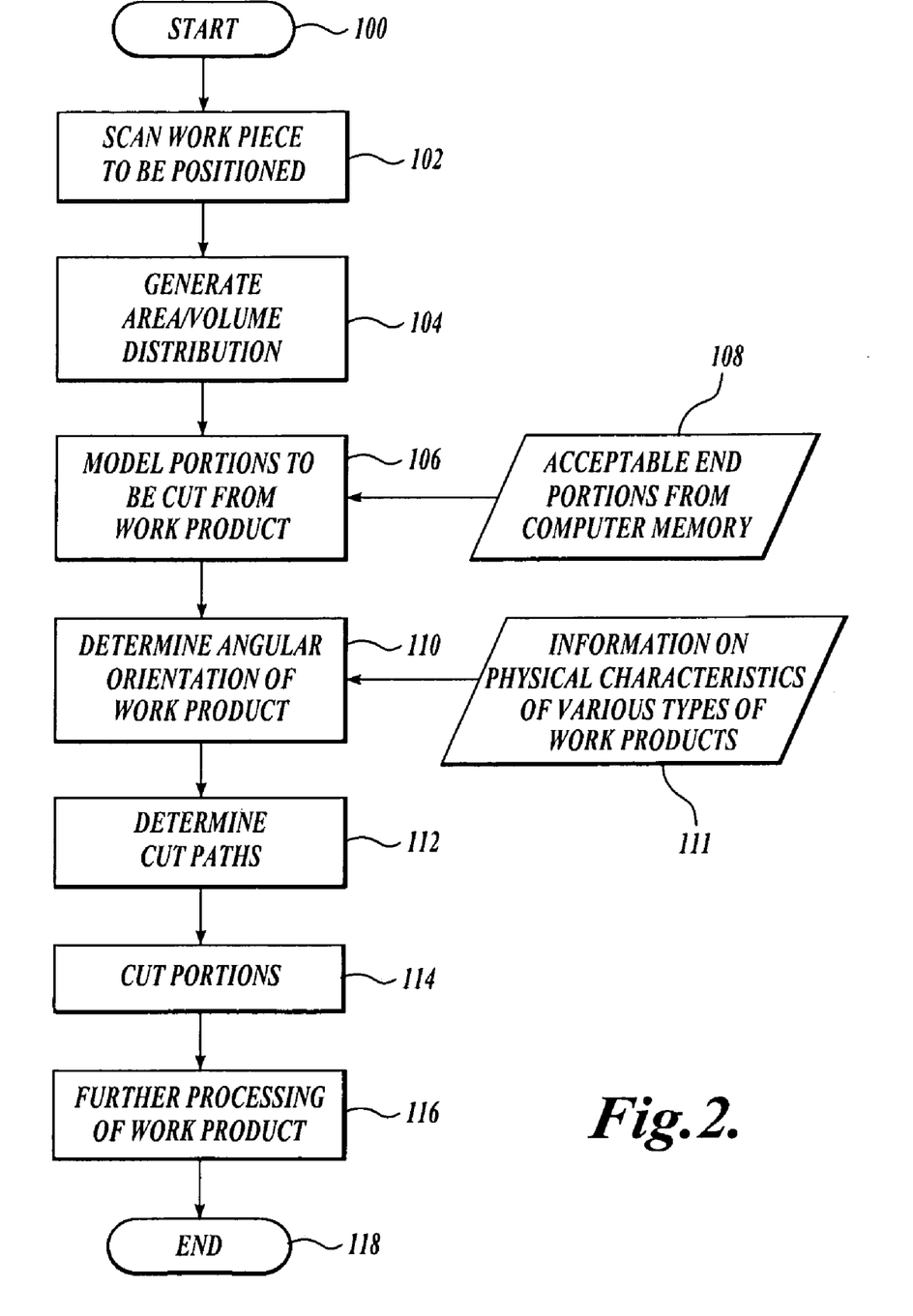
FIG. 2 is a flow diagram of a disclosed embodiment.

Referring to FIG. 2, using system 10 to portion a food product, beginning at 100, the scanning system 16 scans the food product 14 at 102 to produce scanning information representative of the food product, and forwards the scanning information to the computer/processor 22. The computer 22 analyzes the scanning data to locate the food product relative to the conveyor and develop a thickness profile of the scanned food product. The processor at 104 also develops an area and/or volume distribution of the scanned food product. The computer can model the food product at 106 to determine how the food product might be trimmed and/or portioned into end product sets composed of one or more end product portions of specific physical criteria including, for example, weight, shape, thickness, length or width. Data as to desired end product sets may be retrieved at 108 from the computer memory. In this regard, the computer takes into consideration that the food product may be sliced to thickness, flattened, or processed in other ways after the food product has been portioned by the cutter 18. In addition, the computer factors in any defects found in the food product during the scanning process.

The computer at 110 determines the angular orientation of the food product using information about the physical characteristics of the food product, and with this information as well as the modeling of the food product, the computer at 112 determines how the food product may be trimmed, cut and/or portioned into one or more end product sets. The computer at 114 then controls the cutter to trim the food product and/or cut the food product according to the selected end product set. The computer at 116 may also control the further processing of the food product to arrive at the end 118 of the processing.

Knowing the angular orientation and location of the food product is important because portioning of food products, including food products, is carried out in relationship to the shape of the food product. If the angular orientation and location are not ascertainable by the scanning/processing system, then it is necessary that the food product be loaded on the conveyor in perfect alignment along the length of the conveyor and in the same angular direction so that the portioning program only needs to establish the food product location in one dimension, i.e., along the length of the conveyor. However, loading the food product in exact longitudinal alignment (for example, along the center line of a conveyor) on the conveyor and/or in the same exact direction for every workpiece requires close attention by loading personnel, and thus is difficult to achieve. If the location and angular orientation of the workpiece can be ascertained by the scanning/processing system, then it is possible to load the workpieces at a faster rate thereby increasing the throughput of the system.

Knowledge of the angular orientation of the food product can also be useful to the computer in modeling the food product. If the food product has characteristic bones, cartilage or other features, the software used to model the food product may reference from such feature. For example, the modeling of poultry breasts can be begun from the keel channel where the breast keel cartilage is located.

Describing the foregoing system in more detail, the computer 22 includes a central processing unit 24 (hereinafter CPU) and a memory unit 26. Data consisting of physical and/or anatomical features of different types of food products can be stored in the computer memory 26. Also, data consisting of desired end product shapes can also be stored in the computer memory 26. The data stored in the computer memory can be readily selected by the user via user interface 28, for example, when changing product lines. For instance, system 10 may be used for processing chicken breasts for a particular customer. When the order for the customer is filled, the user may switch the mode of the computer to a different food product having different physical/anatomical features. The computer 22 also includes an output device 30 usable to display or print data, information, or images related to the processing of the food product.

As shown in FIG. 1, the computer 22 can be in communication with a network system 32 which allows the computer to talk to and share information with other computers. As noted above, computer 22 can also drive other peripheral hardware besides the scanning system 16. For example, computer 22 can direct the operation of the conveyor 12, cutting device 18, slicer 20, as well as other processing apparatus that may be utilized. Further, the computer 22 can receive information from various sensors, including encoder 34 to guide or direct a multitude of systems.

The conveyor 12 carries the food product 14 beneath the scanning system 16. The scanning system 16 may be of a variety of different types, including a video camera 36 to view the food product 14 illuminated by one or more light sources 38. Light from the light source is extended across the moving conveyor belt 40 to define a sharp shadow or light stripe line, with the area forwardly of the transverse beam being dark. When no food product 14 is being carried by the infeed conveyor 12, the shadow line/light stripe forms a straight line across the conveyor belt. However, when a food product 14 passes across the shadow line/light stripe, the upper, irregular surface of the food product produces an irregular shadow line/light stripe as viewed by a video camera 36 directed diagonally downwardly on the food product and the shadow line/light stripe. The video camera detects the displacement of the shadow line/light stripe from the position it would occupy if no food product were present on the conveyor belt. This displacement represents the thickness of the food product along the shadow line/light stripe. The length of the food product is determined by the distance of the belt travel that shadow line/light stripes are created by the food product. In this regard, encoder 34 is integrated into the infeed conveyor 12, with the encoder generating pulses at fixed distance intervals corresponding to the forward movement of the conveyor.

In lieu of a video camera, the scanning station may instead utilize an x-ray apparatus for determining the physical characteristics of the food product, including its shape, mass, and weight. X-rays may be passed through the object in the direction of an x-ray detector (not shown). Such x-rays are attenuated by the food product in proportion to the mass thereof. Scanner system 16 includes a generator 36 to irradiate the food product 14 to be scanned with x-ray radiation and a receiver 38 to receive the attenuated radiation. The receiver portion 38 can be integral with the generator 36.

Attenuation of the x-rays can occur by passing through the food product or by reflection from the food product. When radiation passes through the food product, a certain amount of radiation is absorbed by the food product through which it passes, therefore there will be a relationship in the amount between the radiation sent to the food product and the radiation received after it has passed through the food product. The cause of absorption is believed to reside in the chemical bonds within the molecules of the food product. Radiation once attenuated can be collected, and converted into a useable form. Photodiodes, for example, may be used to convert an amount of radiation in the visible range into a voltage or current signal. For x-rays, a scintillating material may be used to generate visible light capable of detection by a photodiode. This method is described in U.S. Pat. No. 5,585,603 to Vogeley, Jr., which is incorporated herein by reference.

Although the foregoing description discusses scanning by use of a video camera 30 and light source 32, as well as by use of x-rays, other three-dimensional scanning techniques may be utilized. Examples of additional techniques may include ultrasound or moiré fringe methods. In addition, electromagnetic imaging techniques may be employed. Thus, the present invention is not limited to use of video or x-ray methods, but encompasses other three-dimensional scanning technologies.

The data and information measured/gathered by the scanning device(s) is transmitted to the processor 22, which records the location of the food product 14 on the conveyor 12, both transversely and longitudinally relative to the conveyor, as well as the length, width and thickness of the food product about the entire area of the food product. With this information, the processor can develop an area map, an area profile as well as a volume profile of the food product. Knowing the density of the food product, the processor can also determine the weight of the food product or segments thereof.

The scanning information can also be used to ascertain whether there are any defects in the food product. Such defects might include tears, holes, fat, bone, or cartilage. For example, if an x-ray apparatus is utilized, if a hole or tear exists, the x-rays will be attenuated to a lesser extent than if the food product was structurally intact. Also, for food products composed of raw meat, the density of fat, bones, and cartilage is different from the density of the meat. This density variation results in a difference in the attenuation of the x-rays passing through the food product. For example, the density of bone is greater than the density of the meat. Thus, the x-rays passing through the bone will be attenuated to a greater extent than the x-rays passing through the meat. As a consequence, by the scanning process, the existence as well as the position and size of the defects in the food product may be ascertained. Examples of the foregoing scanning devices are disclosed in U.S. Pat. No. 6,563,904, incorporated by reference herein.

Figure 3:
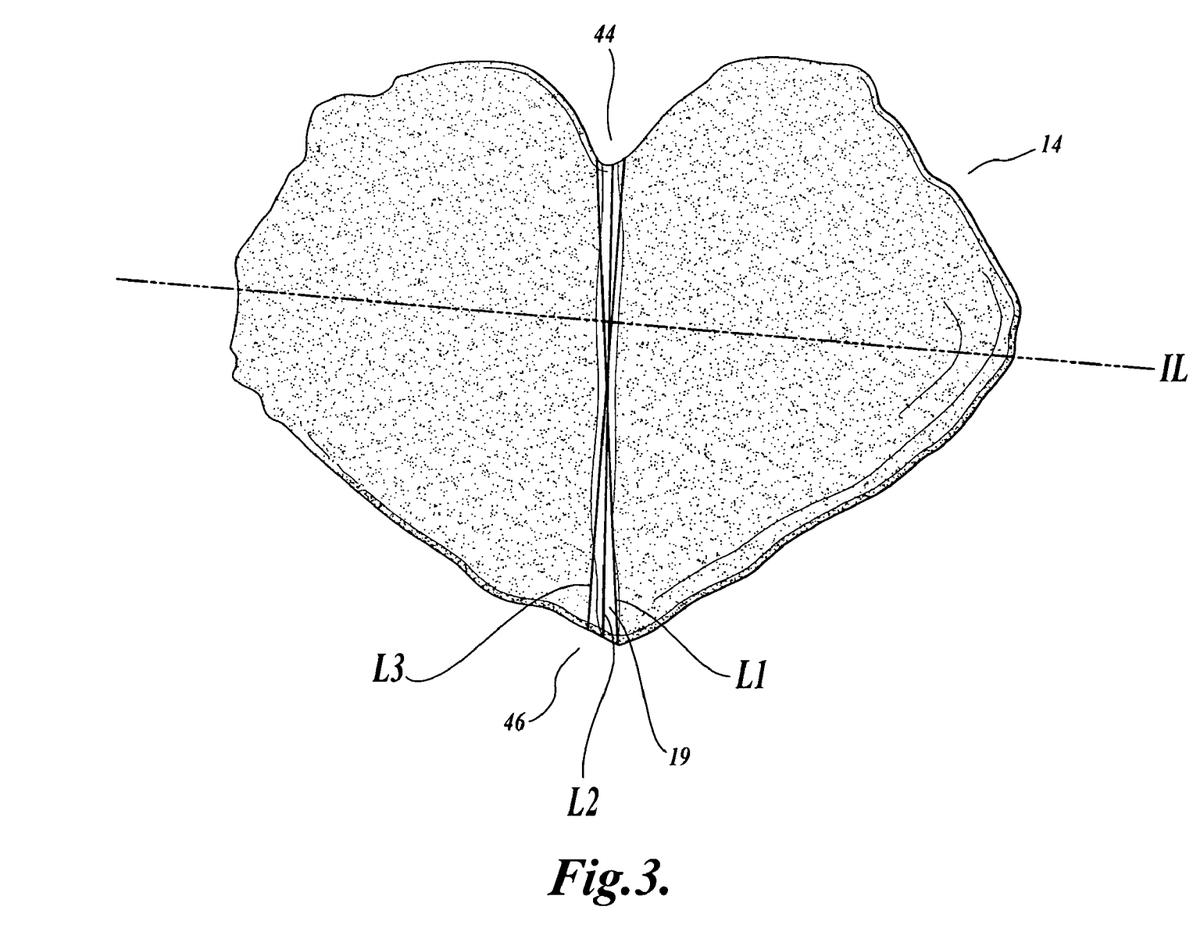
FIG. 3 illustrates various directional lines used to determine the location and direction of the keel line in a poultry breast.

The scanning data can also be used to locate other physical features or attributes in the food product that are related to the angular orientation of the food product. For example, food products may include cutouts, notches, or other similar physical features in the interior or at the perimeter of the food product that is indicative of a physical attribute of the food product that can be used to determine the angular orientation of the food product. For fish, meat, or poultry food products, these physical features may consist of or be related to anatomical characteristics. For example, as shown in FIG. 3, in poultry breasts, when the neck is removed, an indentation or notch 44 is typically formed in the adjacent portion of the breast at the centerline or the keel 19.

As a further physical feature, food products, may commonly include a projection extending from the perimeter of the food product that corresponds to a particular location on or physical characteristic of the food product. For example, in fish and poultry, the projection may correspond to the location of the tail, or on fruit, the projection can be a stem. Moreover, in poultry breasts, as shown in FIG. 3, the tail projection 46 is positioned at the opposite end of the breast keel 19 from the location of the neck notch 44. Thus, for poultry breasts, a line or axis extending between the neck notch and the tail projection will coincide with the direction of the breast keel. Thus, in poultry breasts, the location of the notch 44 and projection 46 can be used in combination to locate the direction of the breast keel, see Line L1 in FIG. 3. In other types of food products, a plurality of notches and/or projections may exist that provide reference locations useable to determine the angular orientation of the food product.

As another attribute, the scanning information can be used to determine whether a food product has a linear depression or indentation that is a physical feature or characteristic of the food product. Such depression may correspond, for instance, to an anatomical characteristic of poultry, fish, meat, or other types of food products. For example, in poultry breasts, a linear depression may extend along the length of the keel cartilage line see Line L2 in FIG. 3. In poultry breasts, this depression is referred to as the keel channel, which may not necessarily run the full length of the keel and, in certain situations, may be difficult to detect, or even be undetectable. Nonetheless, if present, it can be detected by the foregoing scanning process.

It will be appreciated that x-rays that pass through the keel channel will be attenuated to a lesser degree than x-rays passing through thicker locations of the poultry breasts. Such a line of reduced attenuation x-rays can be detected through the scanning of the poultry breast. In other types of poultry, meat, or fish food products, the removal of cartilage or bones may also leave a linear depression in the food product that can be detected to determine the orientation of the food product.

As described above, in meat and fish products the density of bones and cartilage is different from the density of the meat or fish. Thus, by scanning the food product not only can the presence of a bone or cartilage by ascertained, but the direction of the bone or cartilage can also be determined. This information can be used to establish the orientation of the food product, including, for example, the orientation of a chicken breast having the breast cartilage in place, a poultry thigh, with the thigh bone in place, a fish fillet with the backbone in place, a beef side with the ribs in place, etc.

As noted above, the scanning data can be used to develop the area distribution or volume distribution of the food product. From this information it is possible to calculate the line of least inertia (principal axis) from the second moments of the volume or area distribution of the food product. The principal axis can then be used to determine the angular orientation of the food product. This determination can be made using the basic formula:

$$I_x = \int y^2 dA \quad \text{(Equation A)}$$

wherein:
$I_x$=the moment of inertia about the axis x
dA=an elemental area
y=the perpendicular distance to the element CIA from the axis x The foregoing equation is a general equation for determining the second moment of inertia. By manipulating this formula to ascertain the minimum value of the second moment of inertia, the location of principal axis of the food product can be ascertained. This assumes that the food product is positioned "lengthwise" relative to the direction of travel of the food product. However, if the food product is positioned "widthwise" relative to the direction of travel of the food product, then the axis of symmetry of the food product is at a 90° angle from the axis of least inertia. This is applicable, for instance, with respect to poultry breasts. In these situations, the line of least inertia (IL) can be calculated in a direction 90° to the principal axis (keel line), see Line L3 in FIG. 3.

Figure 4:
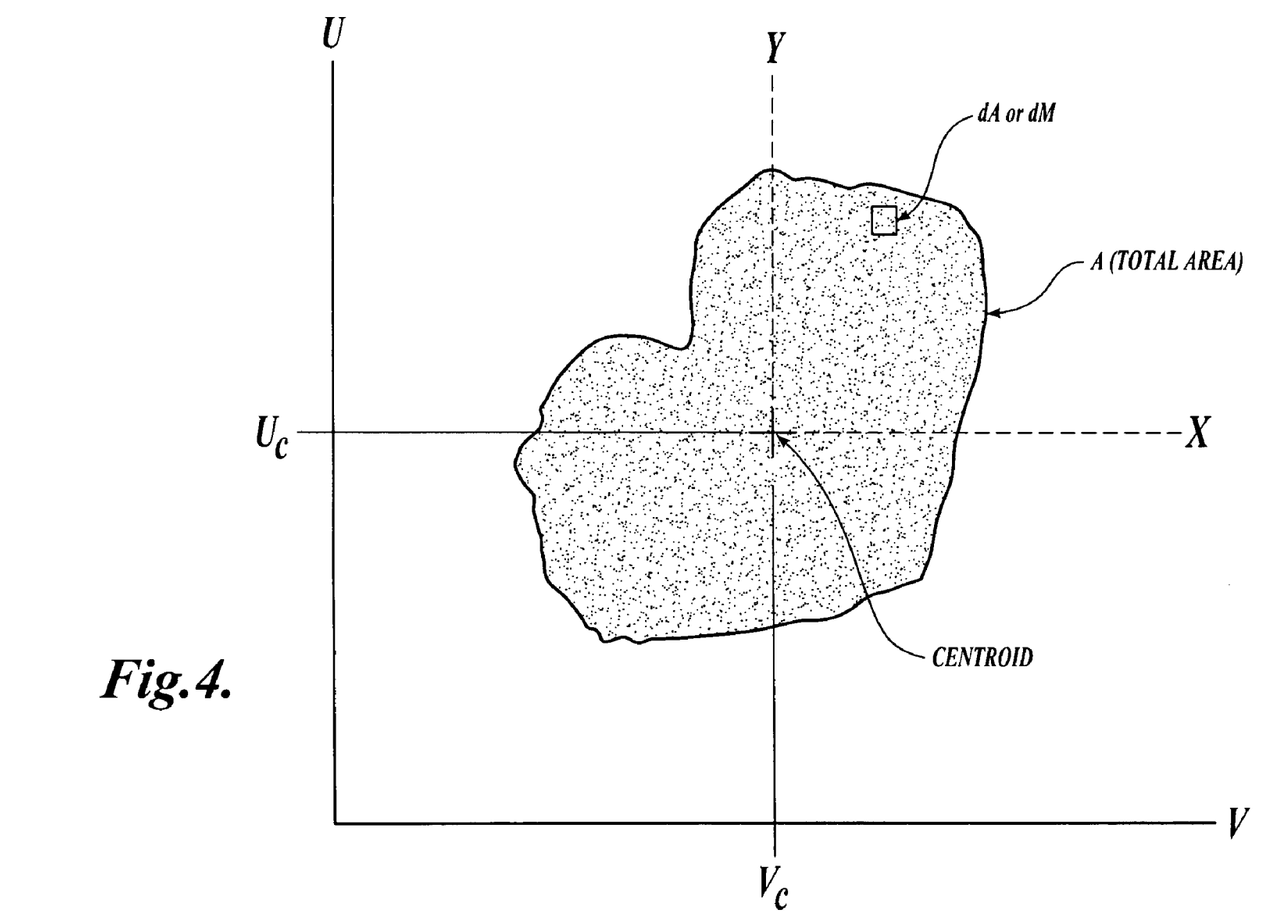
FIG. 4 is a plot illustrating the determination of the principal axis from the least moment of inertia of a poultry breast.
Figure 5:
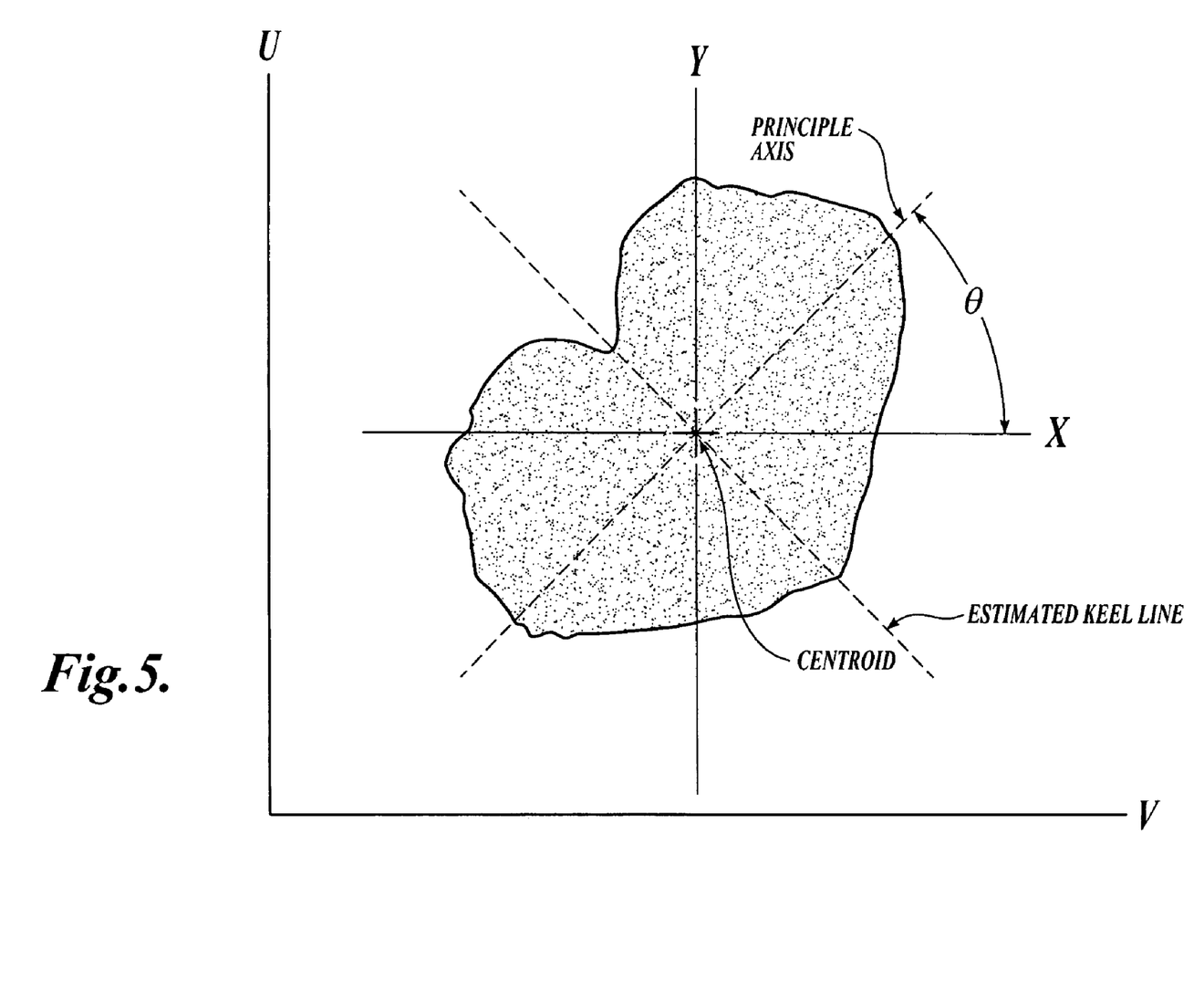
FIG. 5 is a view similar to FIG. 4, estimating the location of the keel line from the principal axis.

FIGS. 4 and 5 illustrate determining the keel line for the poultry breast example of FIG. 3 from the principal axis. Referring to FIG. 4, the poultry breast is placed on an arbitrary U-V coordinate system, such as may be defined by the scanner 16. The first step is to find the centroid location using the equations:

$$U_c = \frac{\int U dA}{A} \quad \text{(Equation C)}$$

$$V_c = \frac{\int V dA}{A} \quad \text{(Equation D)}$$

Where:
$U_c$ is one centroidal axis;
$V_c$ is the second centroidal axis;
dA equals an elemental area; and
A equals total area.

Next, a switch is made to the X-Y coordinate system to determine the second moment of inertia, utilizing the basic Equation B particularized for the X-Y coordinate system as follows:

$$I_{xx} = \int y^2 dA \quad \text{(Equation E)}$$

$$I_{yy} = \int x^2 dA \quad \text{(Equation F)}$$

$$I_{xy} = \int xy^2 dA \quad \text{(Equation G)}$$

Equations E, F and G provide the principal axis via the least moment of inertia. However, as noted above, the location of the poultry breast keel 19 will be 90 degrees from the axis of the least moment of inertia. The location of the keel can be determined using the equation:

$$\text{TAN}(2\theta) = I_{xy}/(I_{yy} - I_{xx}) \quad \text{(Equation H)}$$

Equation H is solved for θ. Thus, using the foregoing equations, the location of the centroid relative to the X-Y axis can be determined, as well as the angular orientation of the poultry breast relative to such coordinate system.

Rather than utilizing the entire scanned area of the food product or poultry breast, the principal axis analysis can be carried out by analyzing the food product above a certain elevation of the food product. In this regard, the "elevation" is the distance from the bottom surface of the food product, with the food surface setting on an underlying surface, such as a conveyer belt. The advantage of doing so is that certain deformities, discontinuities, tears, or other flaws in the work product may be reduced or eliminated with respect to the regions of the food product being analyzed. For example, in a chicken breast, if the analysis were carried out using the regions of the chicken breast above a selected elevation, two regions would result, one on each side of the keel. Moreover, variability in the chicken breast due to fat, rib meat, tears, and thin areas would be diminished. In this analysis, it would be necessary to confirm that the two regions selected are at a minimum distance apart from each other, to make sure that regions on both halves of the poultry breast is being analyzed. If the two regions are too close to each other, then the two regions may be on the same half of the poultry breast, rather than on opposite sides of the breast. With respect to poultry breasts, the regions should be from about 50 mm to 100 mm apart from each other. Of course, this minimum distance may vary due to the size of the poultry breast or the type of poultry involved.

Once the two regions have been identified, the same analysis can be carried out as described above in determining the principal axis of the food product based on the two elevated regions identified. From the principal axis, the angular orientation of the food product can be ascertained. In this analysis technique, the elevation above which to analyze the food product will need to be determined. This determination can be carried out in several ways. For example, the system operator can set the elevation level based on the type of food product being processed, for instance the type of poultry, as well as the breed and age of the poultry being processed. As an alternative, the principal axis analysis can be carried out at several selected elevations, and then the computer can be used to seek a band of elevations where the result in the location of the principal axis does not change very much. With that information, the central average of the analyzed bands can be selected as the analysis elevation.

Another means of determining an appropriate elevation level for the analysis is to set a percentage of the area, as viewed from above the food product, to a fixed amount, say 55% that is below the desired elevation. The computer, using data from the scanner, finds the elevation at which the area of the food product, as viewed from above the food product, has fallen the set percentage of the area of the food product at zero elevation below the area at zero elevation. For example, if the area of the food product is 30,000 square millimeters (zero elevation), and it is desired that the percentage of area to drop to be 55%, then a look-up is performed with respect to the scanned data to find the elevation where the area is 30,000−0.55×30,000=13,500 square millimeters. For instance on a food product such as a typical chicken breast butterfly, it might be at 8 mm of elevation above the bottom surface of the chicken breast. Depending upon what parameters best tune the system, the desired area percentage area below the desired elevation may be anywhere from 30% to 99.9%. This elevation is then used in the rest of the analysis to find the principal axis and orientation of the food product using any of the methods described above.

The directional lines or axes, corresponding to the angular orientation of the food product as determined by the foregoing techniques, can be mathematically combined together to arrive at a "best fit" or "best determination" singular direction of the line or axes. For instance, each of the lines or axes can be described relative to an X-Y plane according to the equation:

$$Y=M*X+B \quad \text{(Equation B)}$$

Where: M is the slope of the line, and
B is the Y intercept (where X=0).

A sample plot showing such lines is set forth in FIG. 4. Using the above poultry breast example, in FIG. 4, Line L1 may be a line spanning between the neck notch and the tail projection of the poultry breast; Line L2 may be a line extending along the keel valley of the poultry breast; and Line L3 may be the axis of symmetry as determined from the axis of least inertia. In FIG. 4, the Y-axis can correspond to the longitudinal center line of the conveyor belt 40 and the X-axis can correspond to the direction transverse to the longitudinal center of the conveyor belt. Thus, assuming that the lines plotted in FIG. 4 correspond to the keel line of a poultry breast, FIG. 4 shows that the poultry breast is positioned to the right of the longitudinal center of the belt when looking "downstream" of the belt. Also, the keel line of the poultry breast is rotated in the "clockwise" direction with reference to the conveyor belt.

Figure 6:
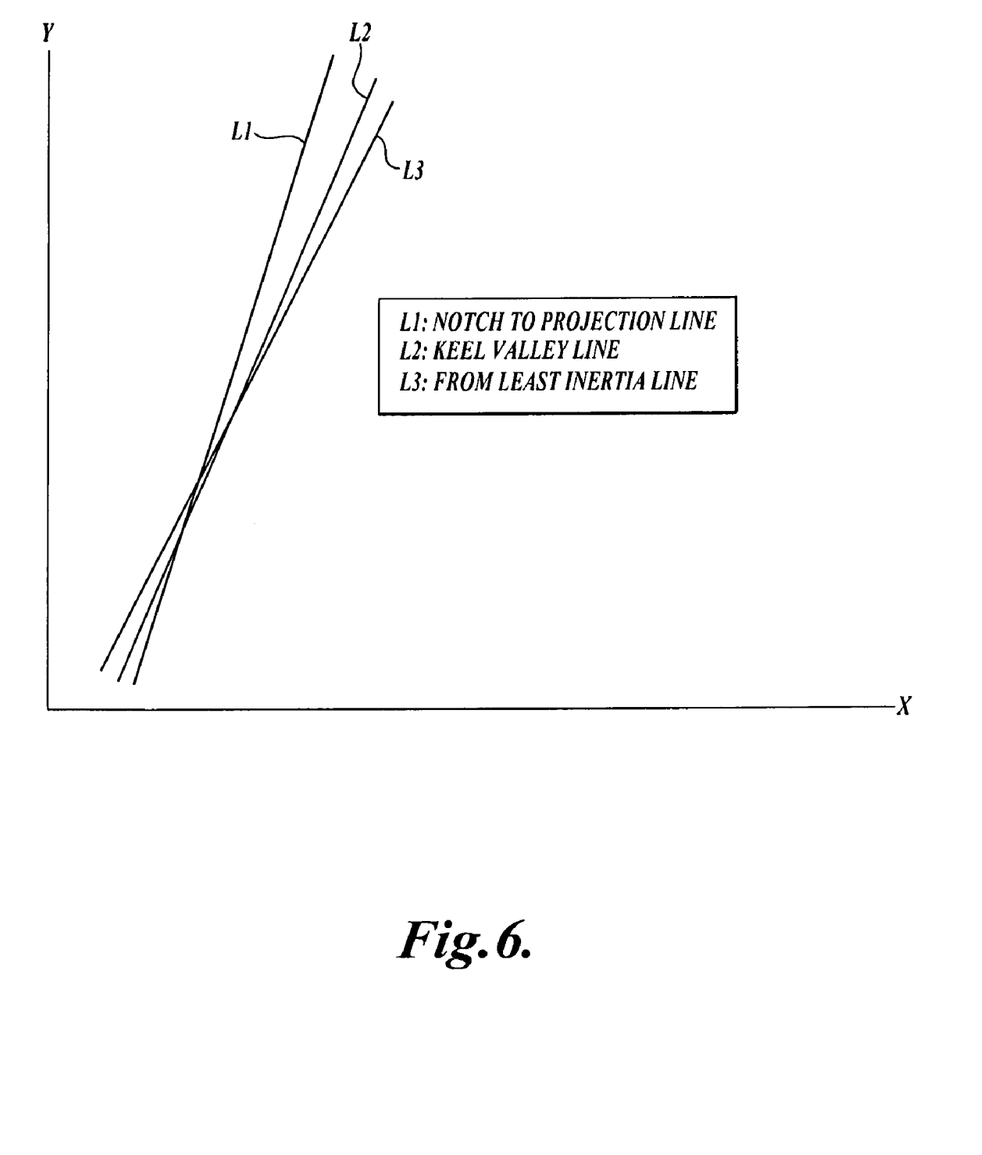
FIG. 6 is a plot of determined directional lines corresponding to the angular orientation of a poultry breast.

FIG. 6 plots the precise length of the line or axis determined from the scanning data using the techniques described above. As such, this information can also be used to locate the food product both laterally and longitudinally on the conveyor belt. Such information can be used in lieu of, or in addition to, determining the location of the food product directly from the scanning data, as described above.

The equations for the three directional lines/axes can be combined using various mathematical techniques, such as neural networks, fuzzy logic, or best curve fitting. Moreover, relative weights can be prescribed to the different reference lines/axes in FIG. 6, for example, by applying a correlation coefficient to Equation B, set forth above. From experience through the use of the present system and method, over time, the relative accuracy of the various directional lines can be evaluated and a correlation coefficient applied to the equations representing historical accuracy of each of the directional lines. For example, experience may show that the directional line extending between the neck notch and tail projection is generally more accurate than a directional line corresponding to the keel depression, at least with respect to angular orientation. On the other hand, experience may show that the directional line corresponding to the keel depression is more accurate than the directional line corresponding to the axis of symmetry determined from the axis of least inertia. Accordingly, correlation coefficients can be assigned to the equations for the directional lines on this basis.

The correction coefficient can also be based on the particular situation for the directional line in question. For example, as discussed above, a linear depression as determined from the scanning information may not run the full length of the depression. Thus, if the scanning determination finds this to be the case, then a coefficient value can be assigned to the corresponding directional line in terms of the expected accuracy that the data being analyzed in fact corresponds to an actual physical feature characteristic of a food product. Similar situational evaluations may be made with respect to the other directional lines.

With the foregoing analysis, a "best determination" of the angular orientation of the food product can be calculated. Of course, other techniques can be applied to the determined directional lines/axes to arrive at the angular orientation of the food product.

Figure 7:
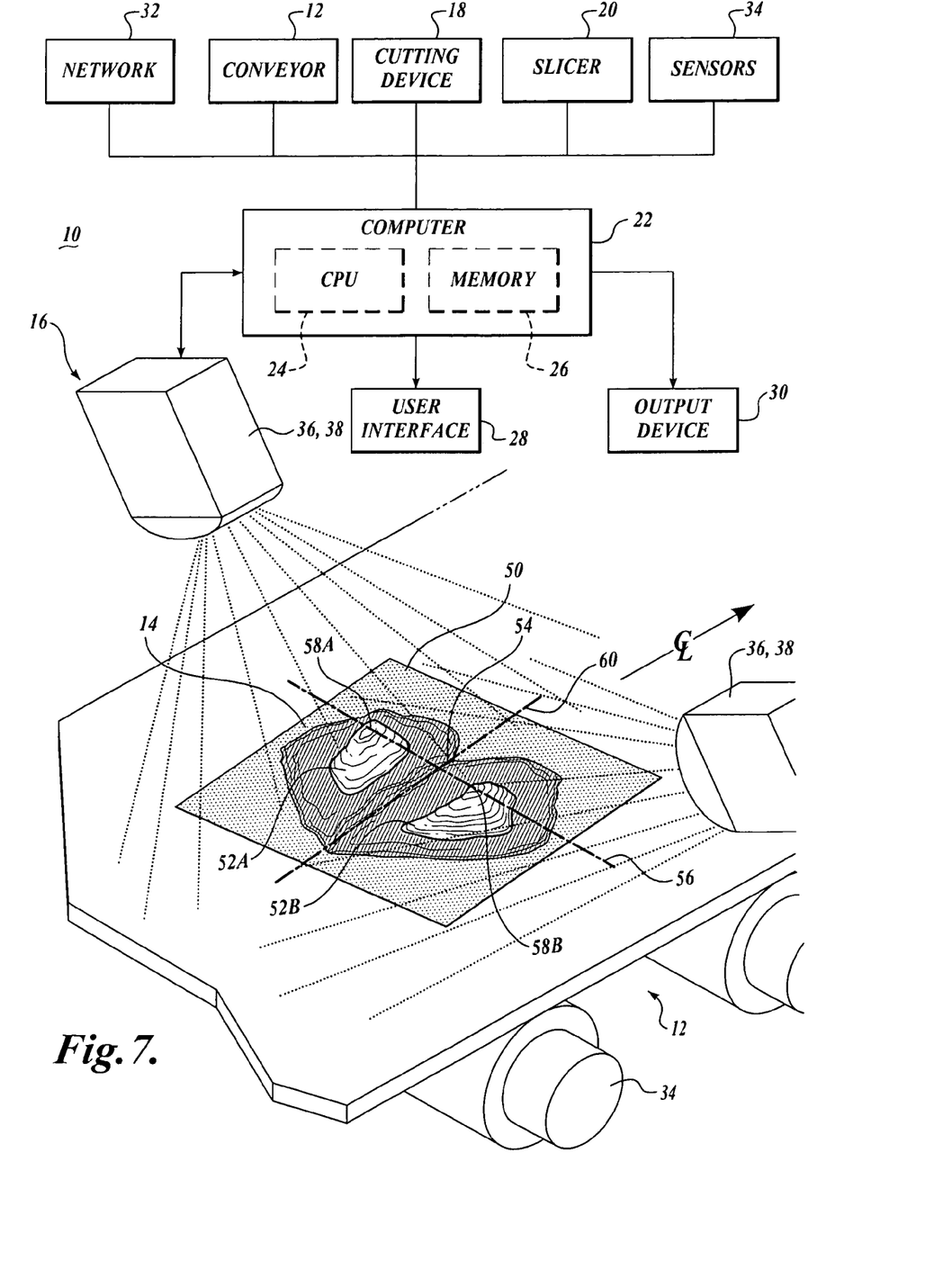
FIG. 7 is a schematic view of a further embodiment.
Figure 8:
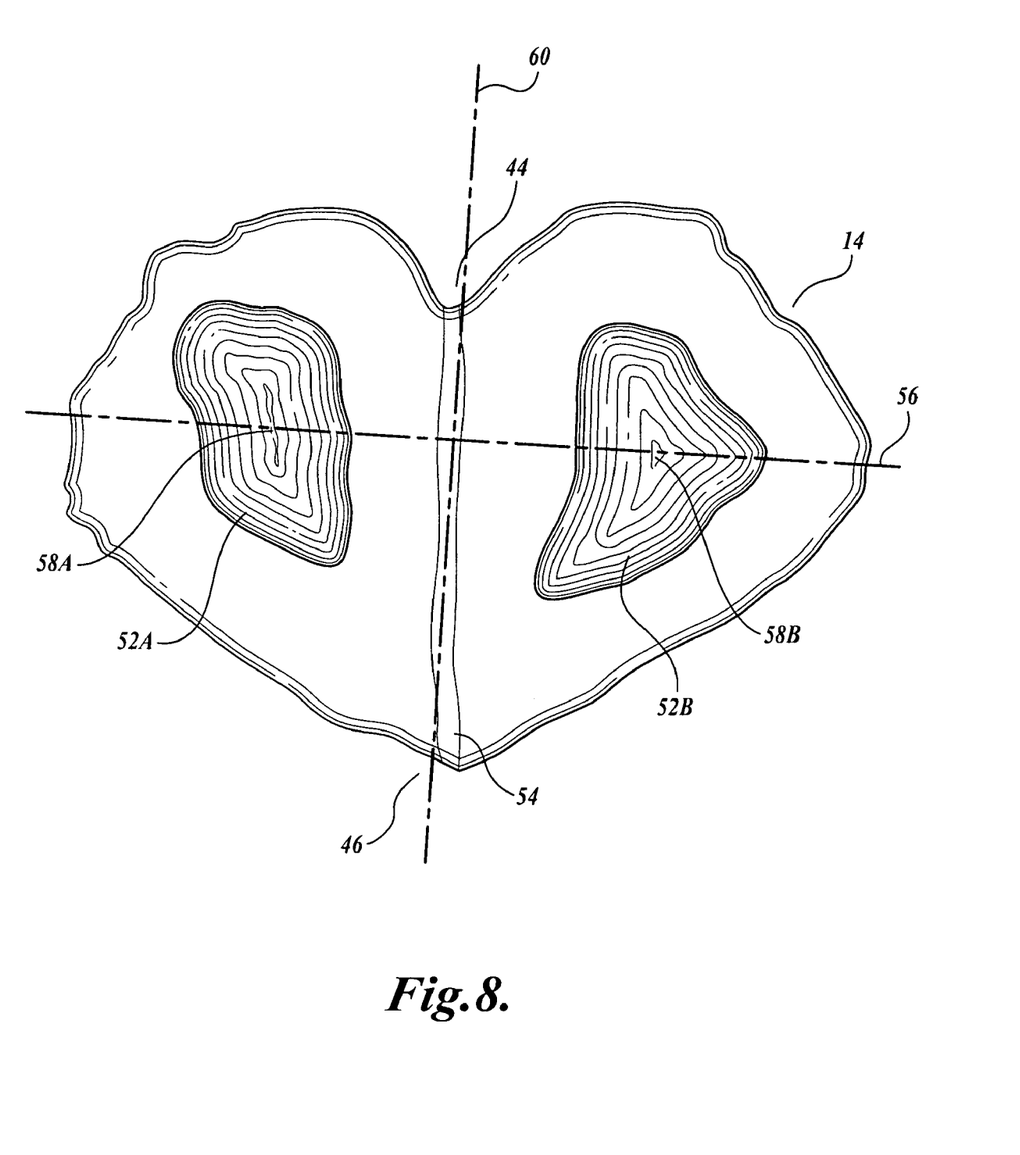
FIG. 8 is a plan view of elevated regions of a poultry breast.

As a further analysis system and method shown in FIGS. 7 and 8, the area distribution or volume distribution of the food product 14 from the scanning data can be carried out for a portion of the food product, rather than the entire area or volume of the food product. In FIG. 7, the components that are the same as in FIG. 1 are represented by the same part number. The portion of the food product chosen for analysis can be that which is located above a selected elevation of the food product. This technique can be particularly useful with food products of a generally symmetrical configuration, such as poultry breasts. In this technique, the food product is analyzed above a selected elevation. This elevation is shown as plane 50 in FIG. 7. For food products, such as poultry breasts, in such an analysis, two spaced apart elevated regions 52a and 52b of the poultry breast are located, one on each side of the breast keel 54. Once the two regions are identified, an area and/or volume distribution analysis of the two regions can be carried out. From the results of this analysis, a central feature of each of the regions can be located. Such central features could include the centroid of the two elevated regions. Alternatively, the central feature could consist of the center of a best fit circle defined by the two elevated regions. As a further non-limiting example, the central feature might include the location of the highest elevation of each of the two elevated regions.

In this analysis technique, a first line segment 56 is drawn between the two central features 58a and 58b of the two elevated locations. This line corresponds to the principal axis of the food product, or poultry breast being analyzed. A second line 60 is drawn perpendicular to the first line while passing through the center of the first line. This second line corresponds to a line of symmetry in the food product. In a poultry breast, the second line may correspond to the location of the keel cartilage of the breast.

In the forgoing analysis technique, the size of the two regions can be relatively small, typically no more than about 2 cm². However, the size of the analysis regions can be as small as one half of a square centimeter. It is desirable that the size of the analysis region be large enough so that an actual "high point" of the food product/poultry breast is actually located, rather than perhaps a small globule of fat or an upturned lip of the food product at an edge thereof.

Also in the present analysis technique, the two analysis regions should be a minimum distance apart from each other to ensure that the regions in fact are on opposite sides of the axis of symmetry. If the two regions are too close together, then both regions might be on the same side of the axis of symmetry of the food product. For poultry breasts, the minimum distance separating the two analysis regions could be approximately 70 mm. However, this minimum separation distance can be of other lengths, for example, from about 50 mm to 100 mm. If in the analysis being carried out, the two located elevated regions are closer together than the specified minimum, the higher of the two regions can be selected, the lower of the two regions eliminated, and then the next highest region that meets the minimum spacing requirement can be selected. Applicants have characterized this particular analysis method as the "twin peaks" method.

As a variation to the above twin peaks method, rather than utilizing the first and second line segments described above, one of the elevated regions (twin peaks) can be selected. A mirror image of the selected elevated region can be generated by use of the computer 22 and then the generated mirror image region placed as close to the selected region as possible. The line of symmetry between the selected elevated region and the mirror image thereof, in the analysis of a poultry breast, would represent the keel centerline of the poultry breast.

The analysis above with respect to generating the principal axis of the food product using elevated regions of the food product set forth various methods and techniques for determining at what elevation the food product should be analyzed. The foregoing discussion also applies to applicant's "twin peaks" analysis method, and thus will not be repeated here.

The "twin peaks" analysis system and method can be used to locate specific physical features on a food product, for example, on a poultry breast. As one example, an idealized shape for the poultry breast can be defined using various relationships with constants. The constants are established that result in the best fit of the scanned poultry breast within the idealized shape. One of the foregoing "twin peaks" methods can be used to find the keel centerline of the poultry breast. Thereupon with the idealized shape and constants, other features of the poultry breast may be located, such as the neck notch, the tail, the rib meat, the wing cutouts, etc. The location of these features can assist in determining how best to portion the poultry breast.

The foregoing technique can also be used in conjunction with the twin peaks analysis itself. For example, an idealized or generic shape of the elevated regions of a poultry breast can be predetermined and then the actual ascertained shape(s) can be "fit" into the idealized shape by rotating, translating, enlarging, changing the aspect ratio of the actual shape or other standard technique. This allows the irregular shape of the elevated region to be simplified. Thereafter, one of the techniques described above with respect to the twin peaks method, such as utilizing a central aspect of the elevated regions or developing a mirror image of a selected elevated region can be utilized to locate the axis of symmetry of the work product/breast keel of the poultry breast.

With the location and angular orientation of the food product located relative to a reference line, for example, the center line CL of conveyor belt 40, processing of the food product can occur. As noted above, such processing might include trimming, cutting or portioning the food product using various cutting devices such as high-speed water jets, lasers, rotary saws, hacksaws, guillotines and band saws. Cutting devices of the foregoing nature are described in U.S. Pat. No. 5,931,175 to Pfarr, which is incorporated herein by reference. Band saws and blades are described in U.S. Pat. No. 5,937,080 to Vogeley, et al., which is also herein incorporated by reference.

With respect to poultry breasts, cutting devices may be used for various processes, including trimming fat from the poultry breast, cutting out the keel cartilage from the poultry breast, and portioning the poultry breast into desired end slices, for example, for sandwich portions, strips or nuggets.

In addition to cutting devices, the food product may be processed using various types of slicers to slice the food product into one or more desired thicknesses. Such slicers may be in the form of a high-speed water jet, a laser, a rotary saw, a hacksaw or a band saw. Also, the slicer may be adjustable so that a desired thickness for each individual food product is obtained.

While illustrative embodiments have been illustrated and described, it will be appreciated that various changes can be made therein without departing from the spirit and scope of the invention.

The embodiments of the invention in which an exclusive property or privilege is claimed are defined as follows:

1. A system for processing poultry breasts, comprising:
    (a) a scanner for scanning the poultry breasts as the poultry breasts are being transported past the scanner;
    (b) a data processor for processing the data from the scanner and using such data to determine the thickness profile of the poultry breasts; and
    (c) wherein the data processor is programmed to determine the angular orientation of the poultry breasts relative to a reference line by:
        using the data from the scanner to determine the configuration of the poultry breasts above a selected elevation along the height of the poultry breasts, said configuration comprising two spaced-apart regions of the poultry breasts,
        locating the keel channel of the poultry breasts based on the configuration and the relative positions of the two determined elevated regions of the poultry breasts; and
        using the foregoing determination of the location of the keel channels of the poultry breasts to establish the angular orientation of the poultry breasts relative to a reference line.

2. The system according to claim 1, wherein in determining the angular orientation of the poultry breast relative to a reference line the data processor programmed to:
    (a) locate a central feature of the two spaced-apart elevated regions;
    (b) draw a first line segment between the two located central features; and
    (c) extend a second line segment perpendicular to the first line segment and passing through the center of the first line segment, said second line segment corresponding to the location of the keel channel.

3. The system according to claim 2, wherein in determining the configuration of the poultry breasts at a selected elevation, the two elevated regions are spaced apart a minimum distance from each other.

4. The system according to claim 3, wherein the spaced-apart distance of the two elevated regions is a minimum of about 50 to 100 mm.

5. The system according to claim 2, wherein the central feature of the two elevated regions of the poultry breasts are selected from a group consisting of:
    the centroids of the two elevated regions;
    the centers of best fit circles of the two elevated regions; and
    the location of the highest elevation of each of the two elevated regions.

6. The system according to claim 1, wherein the elevation along the height of the poultry breasts of the two spaced-apart regions of the poultry breasts is a function of the total area of the poultry breasts.

7. The system according to claim 1, wherein the two spaced-apart elevated regions of the poultry breasts are at an elevation above the elevation of from 30 to 99.9% of area of the food product, this area viewed from above the food product.

8. The system according to claim 1, wherein in determining the angular orientation of the poultry breasts relative to a reference line, the data processor is programmed to:
    select one of the two elevated regions of the poultry breasts;
    generate a mirror image of the selected region; and
    place the mirror image adjacent the selected elevated region, with the resulting line of symmetry between the selected elevated region and its mirror image region corresponding to the location of the keel channel.

9. The system according to claim 1, wherein the data processor is programmed to locate the keel channel by determining the axis of least inertia from the second moment of inertia of the volume or area distributions of the two elevated poultry breasts regions and converting the axis of least inertia into the axis of symmetry of the poultry breasts.

10. The system according to claim 1, wherein the data processor is programmed to:
    define a nominal shape which represents an idealized model of the shape of the elevated poultry breasts regions;
    vary the physical characteristics of the elevated poultry breast regions to establish a best fit between the idealized model and the two determined elevated poultry breasts regions; and
    determine the axis of symmetry of the poultry breast using the best fit shape of the elevated poultry breast regions.

11. A method for processing a food product, comprising:
    (a) scanning the food product;
    (b) developing a distribution map of the food product from the scanning data selected from the group consisting of an area distribution of the food product and a volume distribution of the food product;
    (c) determining the direction of a directional line related to the orientation of the food product relative to a reference line by using the data from the scanner to determine the configuration of the food product above a selected elevation along the height of the food products, said configuration comprising two spaced-apart regions of the food product, and locating the directional line based on the configurations and the relative positions of the two determined elevated regions of the food product:
    (d) utilizing the determined directional line to determine the angular orientation of the food product relative to the reference line; and
    (e) using the determined orientation of the food product to determine how the food product is to be further processed.

12. The method according to claim 11, further comprising:
    (a) locating a central feature of the two spaced-apart elevated regions;
    (b) drawing a first line segment between the two located central features; and
    (c) extending a second line segment perpendicular to the first line segment and passing through the center of the first line segment, said second line segment corresponding to the location of the directional line.

13. The method according to claim 12, wherein in determining the configuration of the food product at a selected elevation, the two elevated regions are spaced apart a minimum distance from each other.

14. The method according to claim 13, wherein the minimum spaced-apart distance of the two elevated regions is a minimum of about 50 to 100 mm.

15. The method according to claim 12, wherein the central feature of the two elevated regions of the food product are selected from a group consisting of:
    the centroids of the two elevated regions;
    the centers of best fit circles of the two elevated regions; and
    the location of the highest elevation in each of the two elevated regions.

16. The method according to claim 11 wherein the elevation along the height of the poultry breasts of the two spaced-apart regions of the food product is a function of the area of the food product.

17. The method according to claim 11, wherein the two spaced-apart elevated regions of the poultry breasts are at an elevation above the elevation from 30 to 99.9% of the area of the poultry breast, the area viewed from above the poultry breast.

18. The method according to claim 11, further comprising selecting one of the two elevated regions of the food product, generating a mirror image of the selected location and placing the mirror image adjacent the selected elevated region, with the resulting line of symmetry between the selected elevated region and its mirror image corresponding to the location of the directional line.

19. The method according to claim 11, wherein the directional line is located by determining the axis of least inertia from the second moment of inertia of the volume or area distributions of the two elevated food product regions and converting the axis of least inertia into the axis of symmetry of the food product.

20. The method according to claim 11, further comprising:
defining a nominal shape which represents an idealized model of the shape of the elevated food product regions;
varying the physical characteristics of the elevated food product regions to establish a best fit between the idealized model and the two determined elevated food product regions; and
determining the axis of symmetry of the food product using the best fit shape of the elevated food product regions.

21. Determining the location and orientation of raw poultry breasts relative to a reference line, comprising:

(a) scanning the poultry breasts;
(b) generating distributions of the poultry breasts from the scanning data selected from the group consisting of an area distribution and a volume distribution of the poultry breasts;
(c) determining the position of the poultry breasts relative to the reference line from the scanning data;
(d) determining the direction of one or more directional lines related to the axis of symmetry of the poultry breasts, selected from the group consisting of:
the line of least inertia for the poultry breast calculated from the second moment of the area or volume distribution of the poultry breast;
a directional line extending between the neck notch as determined from the scanning data and the tail projection as determined from the scanning data of the poultry breast;
a directional line extending along a linear depression of the poultry breast corresponding to the location of the keel of the poultry breast as determined from the scanning data;
a directional line bisecting a line connecting two central features of two spaced apart elevated regions identified on the poultry breasts from the scanning data;
a directional line corresponding to a line of symmetry between a selected elevated region of the poultry breast and a mirror image of the selected elevated region placed adjacent the selected elevated region; and
(e) determining the angular orientation of the poultry breast by considering one or more of the determined directional lines.

* * * * *

UNITED STATES PATENT AND TRADEMARK OFFICE
CERTIFICATE OF CORRECTION

PATENT NO. : 7,621,806 B2 Page 1 of 1
APPLICATION NO. : 12/273491
DATED : November 24, 2009
INVENTOR(S) : R. Bottemiller et al.

It is certified that error appears in the above-identified patent and that said Letters Patent is hereby corrected as shown below:

| COLUMN | LINE | ERROR |
|---|---|---|
| 13 (Claim 2, | 27 line 3) | after "data processor" insert --is-- |

Signed and Sealed this

Twenty-fifth Day of May, 2010

David J. Kappos
*Director of the United States Patent and Trademark Office*